Jan. 31, 1961 G. F. WOODWARD 2,970,201
CONDITION-RESPONSIVE SYSTEM
Filed Nov. 24, 1958
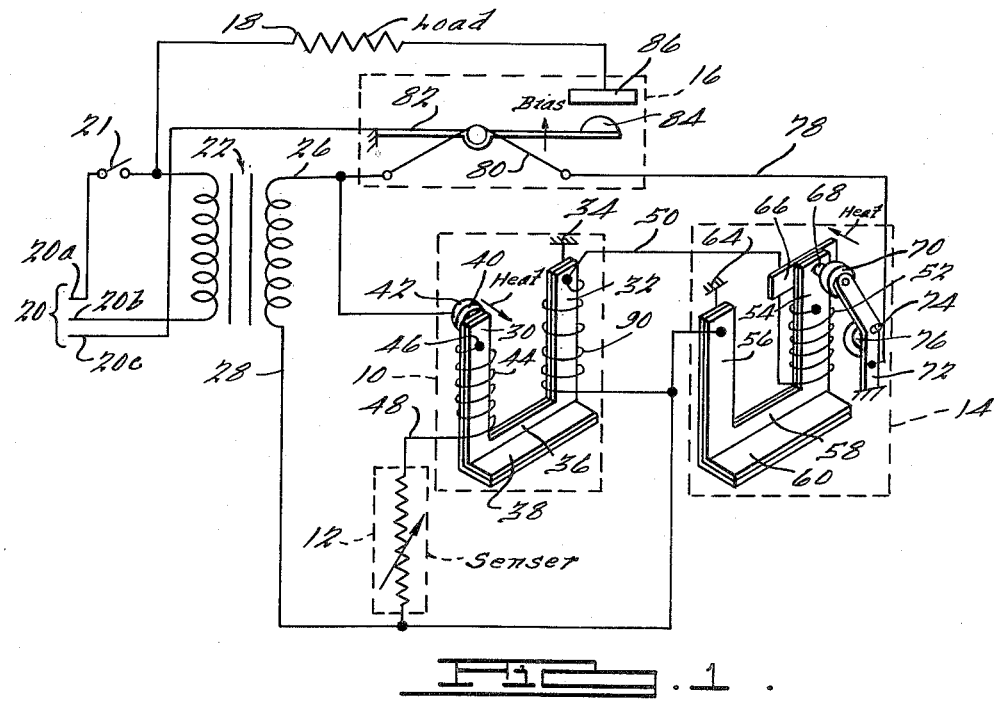
INVENTOR.
Gary F. Woodward.
BY
Harness, Dickey & Pierce,
ATTORNEYS.

United States Patent Office 2,970,201
Patented Jan. 31, 1961

2,970,201

CONDITION-RESPONSIVE SYSTEM

Gary F. Woodward, Ann Arbor, Mich., assignor to King-Seeley Corporation, Ann Arbor, Mich., a corporation of Michigan Filed Nov. 24, 1958, Ser. No. 776,039

25 Claims. (Cl. 219—20)

This invention relates to temperature controlling systems and more particularly to apparatus for controlling the operation of a heater in accordance with the sensed temperature of a body.

This invention is an improvement upon the systems disclosed in the United States patent application of George B. Whinery, Serial No. 604,867, filed August 20, 1956, in the United States patent application of Harry I. Baker, Serial No. 773,263 filed on November 12, 1958, and in the United States patent application of Tore B. Hanssen, Serial No. 773,286, also filed on November 12, 1958, and the disclosures of those patent applications are incorporated herein by reference.

The principles of the present invention are embodied in a system for controlling the operation of a heater disposed in heat transfer relationship with a body of air such as in the air in an oven or a building, in heat transfer relationship with a container body such as a pan disposed in heat transfer relation with the surface heating element on a stove, or in heat transfer relationship with a body to be cooked, melted or cured such as meat in an oven, food in a pan on the stove, or chemical materials being processed. Certain of the principles of the invention are applicable to temperature or other types of gauging and the term "control" as employed herein is intended to be generic to indication or gauging.

In general, in the disclosed arrangements, the energization of the heater is controlled in accordance with the temperature of the body as determined by a sensing element disposed in heat transfer relation with a body, normally the body being heated, with that sensing element preferably taking the form of a resistor having a high temperature coefficient of resistance.

In the preferred arrangement, the variable-resistance senser is utilized to vary the effective output voltage of a slef-interrupting or pulsing thermal relay in accordance with the sensed temperature of the body. The pulsing relay is normally arranged to deliver output energy as a series or succession of pulsations the effective voltage of which is substantially independent of variations in the voltage of the source of electrical energy for the control system. The output energy from the pulsing relay is applied to a control or responder relay which, in the illustrated embodiment, responds only to the effective value of the applied voltage rather than to the individual pulsations. The responder relay in turn controls an output relay which controls the energization of the heater.

In accordance with certain of the principles of the present invention, means in the form of an auxiliary heating element disposed in heat transfer relationship with the pulsing relay are provided to establish a positive feedback or amplifying conditon as a result of which the variation in the effective output voltage of the pulsing thermal relay in response to unit change in the resistance of the senser is substantially magnified.

The principles, objects and features of the invention will best be perceived from the following detailed description of embodiments of the invention when read with reference to the accompanying drawings in which:

Figure 1 is a schematic representation of a temperature controlling system embodying principles of the present invention; and Fig. 2 is a schematic representation of a modified temperature controlling system also embodying principles of the present invention.

The system disclosed in Fig.1 of the drawings comprises a pulser 10 controlled by a senser 12 and controlling a responder 14 which controls an output relay 16 to control the energization of a load 18 from a source of energy 20, the control system also being energized from the source 20 through a transformer 22.

The senser 12 is preferably a resistor (or a plurality of resistors) having a high temperature coefficient of resistance and disposed in heat transfer relationship with a body. Senser 12 may be constructed of wire and have a high positive temperature coefficient of resistance or may be, for example, a ceramic thermistor element having a high negative temperature coefficient of resistance, it being assumed in the illustrated arrangement that a senser having a high positive temperature cofficient of resistance is employed.

Intimate heat transfer relationship between the senser 12 and the body, the temperature of which is being sensed, may be established in any appropriate fashion. For example, the senser may be disposed within a pointed probe for insertion in meat in an oven or in food being cooked in a pan; it may be disposed in a room or in an oven for sensing the temperature of the air; or it may be disposed at the center of a surface heating element in a stove to sense the temperature of the bottom of a pan disposed upon the surface element. An example of a senser unit for the latter purpose and suitable for utilization as an element of the subject system is disclosed in the United States patent application of E. E. Sivacek, Serial No. 604,917, filed August 20, 1956, and the disclosure of that application is incorporated herein by reference.

The load 18 is herein assumed to be a heating element of the electrical resistance type. Heater 18 will normally, but not necessarily, be disposed in heat transfer relationship with the same body, the temperature of which is being sensed by senser 12.

The source 20 which supplies the electrical energy for the control system may be, for example, a line source of alternating voltage such as is found in the home and is represented as a three-line source, with a nominal 115-volt alternating potential existing between lines 20a and 20b (the neutral) and with a nominal 230-volt alternating potential existing between lines 20a and 20c. As is well known, the line voltage is subject to substantial variation and accordingly, one of the functions of pulsing device 10 is to prevent such variations of line voltage from adversely affecting the consistency of operation of the equipment.

Upon the closure of switch 21, the alternating voltage between lines 20a and 20b is applied across the primary winding of step-down transformer 22 so that a reduced-magnitude voltage appears across the secondary winding of that transformer and hence between conductors 26 and 28. This voltage is applied through the senser 12 to the electro-thermal voltage regulating device 10, one function of which is to receive the noticeably variable voltage between conductors 26 and 28 and to deliver pulsating energy to the device 14 having an effective value which is substantially independent of the variations in the voltage of the source.

Basically, device 10 can be characterized as including a thermally responsive member, at least a portion of which tends to move as a consequence of changes in the temperature thereof. Current modulating means, comprising a pair of electrical contacts in the illustrated arrangement, are associated with this member so as to respond to that tendency to move. The current modulating means serve to increase the heat energy supplied to the thermally responsive member in response to decreases in temperature thereof, and vice versa. Consequently, throughout at least a predetermined range of voltages of the source, the current modulating means periodically increase and decrease the energy supplied to the thermally responsive member and cause it to be maintained at a substantially uniform average temperature for any given resistance of senser 12. On this basis, it will be appreciated that the thermally responsive member receives energy, in pulsating form, at an average rate which does not vary with variations in the line voltage. Consequently, the output voltage of the device 10 is in the form of a series or succession of energy pulsations having an effective voltage (a voltage producing the same heating effect in a resistive load as a direct voltage of that same value) which is substantially independent of variations in the source voltage. Further information as to the design and theory of operation of units of this type will be found in United States Patent No. 2,835,885, granted May 20, 1958, to L. Boddy.

Device 10 comprises a polymetallic (representatively bimetallic) thermo-responsive unit including a pair of leg portions 30 and 32 representatively illustrated as lying substantially in a common plane and extending in spaced parallelism with one another in that plane. One end of leg portion 32 is anchored or fixed, as is indicated by the earthing symbol 34 (which does not connote electrical grounding) and the other end of leg portion 32 is joined to one end of leg portion 30 by means of a crosspiece 36. An upstanding flange 38 is provided to increase the stiffness of crosspiece 36 to the point where that crosspiece will not deflect to any significant degree in response to the mechanical or thermal forces to which the unit is subjected.

The other end of leg portion 30 carries an electrical contact 40, that contact being electrically as well as mechanically integral with leg portion 30. Contact 40 is adapted to cooperate with a fixed or adjustably fixed contact 42, and the unit is constructed so that those contacts are in firm engagement with one another when the temperature differential between leg portions 30 and 32 is zero or substantially zero. It will be appreciated that the provision of a U-shape member of the nature shown will permit compensation for ambient temperature variations since the effect upon the position of contact 40 of heating of leg portion 30 is the opposite of that produced by heating of leg portion 32.

Differential heating of leg portions 30 and 32 is accomplished by heating means in the form of a heater winding 44 representatively disposed in heat transfer relationship with the leg portion 30, and more particularly, coiled around that leg portion. One end of heater winding 44 is electrically connected to leg portion 30 as at 46, and the other end of that winding is connected to conductor 48 which is connected through the senser 12 to conductor 28. The fixed or adjustably fixed contact 42 is connected to conductor 26. As a result, heater winding 44 is connected in series with senser 12, across the secondary winding of transformer 22 each time that contacts 40 and 42 are closed so that current flows through those contacts, through the heater winding 44 and through senser 12. The resultant heating of leg portion 30 causes the contact-carrying end of that portion to deflect in a direction to separate contact 40 from contact 42. When the contacts 40 and 42 are separated, the energizing circuit for heater winding 44 is interrupted, and leg portion 30 commences to cool, deflecting in a direction to bring contact 40 into re-engagement with contact 42 to re-establish the initial conditions. Leg portion 30 continues to deflect in alternate directions with a small-amplitude motion, tending to maintain the effective wattage input (for any given resistance of senser 12) to the heater winding 44 constant. As a result, the heater winding 44 will receive energy as a series of pulsations the average or effective voltage of which does not vary with variations in the magnitude of the voltage of source 10, and a pulsating voltage will appear between leg 30, and any parts electrically integral therewith, and conductor 28. Since the resistance of wire 44 is fixed, the effective current through heater 44 and hence through senser 12 will also not vary in magnitude with supply voltage variations. The effective voltage appearing between polymetallic element 30 and conductor 28 and hence between output conductor 50 and conductor 28 equals the sum of a fixed voltage drop across heater 44 and a variable voltage drop across senser 12, the former being determined by the product of the fixed effective current and of the fixed resistance of heater 44 and the latter being determined by the product of the fixed current and the variable resistance of senser 12. Therefore, the effective output voltage from device 10 does not vary with changes in the voltage of source 20 but does vary directly with the resistance of senser 12. This output voltage appears between conductors 50 and 28.

While it was assumed in the foregoing discussion that the resistance of heater 44 is constant, it will be recognized that a wire having a positive temperature coefficient of resistance may be employed for that heater to vary the operating conditions if desired.

An arrangement for modifying the effect of the changes of the value of the sensing resistor upon the output voltage will be described hereinafter. The output voltage appearing between conductors 50 and 28 is applied across heater winding 52 of the responding device 14, one end of wire 50 being connected to one end of heater 52 and the other end of heater winding 52 being electrically connected to leg portion 54 of a U-shape polymetallic element also including leg portion 56 disposed in spaced parallelism with leg portion 54 and crosspiece 58 which is provided with a flange 60. This polymetallic element is or may be similar to the polymetallic element of the pulsing device 10.

The tip of leg portion 56 is anchored as is represented by the earthing symbol 64 in Fig. 1. Conductor 28 is connected to leg portion 56 and hence the entire polymetallic element is at the potential of conductor 28. Therefore, since one end of heater 52, on leg portion 54, is electrically connected to leg portion 54, it is also connected to conductor 28 through leg portion 54, crosspiece 58 and leg portion 56.

In the illustrated arrangement, an armature 66 and an electrical contact 68 are secured to the free end of leg portion 54, electrical contact 68 being electrically integral with leg portion 54. Contact 68 is matable with an electrical contact 70 which is attached to the free end of an angled spring 72, the other end of which is anchored or fixed.

The device 14 integrates the pulsations of energy which are applied to it from device 10 and responds only to the effective value of the voltage between conductors 50 and 28 and a spread or differential exists between the effective voltage at which the contacts 68 and 70 are brought into engagement and the higher voltage at which contacts 68 and 70 are separated. In the illustrated embodiment, this spread is established by employing a permanent magnet to produce a snap action of the contacts, the permanent magnet in this case also serving as the contact 70. This magnet cooperates with armature 66 so as to restrain separation of the contacts 68 and 70, those contacts being engaged, as a result of the pretension or bias in the polymetallic element of the device 14, when the leg portions 54 and 56 are of equal temperatures.

In response to an increase in the effective voltage appearing across winding 52, leg portion 54 heats, tending to deflect in a direction to separate contact 68 from contact 70. This separation is inhibited by the magnetic action. However, when the effective voltage rises to a sufficient value, the contacts 68 and 70 abruptly separate. If thereafter the effective voltage applied across winding 52 reduces, the temperature of leg portion 54 is lowered, and contact 68 approaches contact 70. When contact 68 is in a selected degree of proximity to contact 70, the magnetic attraction between permanent magnet 70 and armature 66 produces a rapid movement of the contact 68 into engagement with contact 70.

The system acts thermostatically, an increase in the temperature sensed by senser 12 producing (with a positive temperature coefficient of resistance senser) an increase in the output voltage between conductors 50 and 28 of a sufficient magnitude to produce separation of contacts 68 and 70. These contacts will remain separated until the sensed temperature reduces sufficiently to drop the effective voltage between conductors 50 and 28 to a value such that contact 68 will approach contact 70 sufficiently closely to produce snap closure. The contacts will remain closed until such time as the sensed temperature again rises to the selected higher value.

It will be appreciated that it is not imperative to the practice of the principles of the present invention that contacts 68 and 70 be snap acting or that the element 14 integrate the pulses but such an arrangement is presently preferred.

The sensed temperatures at which the contacts 68 and 70 are separated or closed is adjusted, in the illustrated arrangement, by adjusting the positon of contact 70. To this end, a screw 74 is threaded through an aperture at the elbow of the spring 72 and engages the face of a cam 76 and hence serves as a cam follower to adjust the position of contact 70 in accordance with the rotational position of cam 76. Cam 76 is manually rotatable in any suitable fashion.

Alternatively, the system may be adjusted electrically as by inserting resistors of selected values in conductor 50.

The closure of contacts 68 and 70 completes a circuit from conductor 28, through those contacts, conductor 78, sag wire 80 of the output relay 16 which is representatively illustrated as a hot wire relay, and via conductor 26 to the other end of the secondary winding of transformer 22.

The hot wire relay 16 which is energized upon the closure of contacts 68 and 70 of device 14 further includes a spring 82 which is pretensioned or biased so as to tend to bring contact 84 carried thereby into engagement with a contact 86. However, when the wire 80 is at normal temperatures, it exerts a force upon the spring 82 serving to deflect the spring so as to separate those eletcrical contacts. When contacts 68 and 70 of device 14 close, the previously traced energizing circuit is completed whereby current flows through wire 80. Wire 80 heats and elongates and permits spring 82 to move contact 84 into engagement with contact 86.

The hot wire relay 16 follows the operation of device 14, closure of contacts 68 and 70 of device 14 producing rapid closure of contacts 84 and 86 and opening of contacts 68 and 70 terminating heating of hot wire 80 and causing contact 84 to be separated from contact 86. When contacts 84 and 86 close, a circuit is completed from conductor 20a, switch 21, load 18, through the contacts, and to conductor 20c to energize the load 18.

The arrangement as thus far described is similar to that disclosed in the above-identified patent application of Harry I. Baker and reference may be had thereto for a disclosure of a suitable physical structure based upon a constructed unit. In that unit, heater winding 44 was selected to have a resistance of 14 ohms, and the resistance of senser 12 varied from 10 ohms at room temperature to about 20 ohms at 450° F. The unit was adjusted so that the relatively constant current through winding 44 and senser 12 was about 150 milliamperes with a supply voltage (across the secondary winding of the transformer) of 10 volts. Heater winding 52 was selected to have a value of about 42 ohms. With these values, it was found that the output voltage of device 10 between conductors 50 and 28 changed from about 4 volts to about 6 volts with changes in the resistance of senser 12 from 10 ohms to 20 ohms.

The present invention pertains to the modification of the magnitude of the change of output voltage of the device 10 with changes in the resistance of senser 12. In the illustrated arrangement, this is accomplished by disposing a heater winding 90 in heat transfer relationship with leg portion 32 of the polymetallic element of device 10 and connecting this winding so that it is responsive to the output voltage of device 10 as it appears between conductors 50 and 28. As illustrated, heater winding 90 is wound around leg portion 32 and one end thereof is connected to leg portion 32 and hence to output condutcor 50 and the other end of heater winding 90 is connected to conductor 28.

The output voltage between conductors 50 and 28 and hence the voltage across winding 90 varies in accordance with the value of senser 12. In the illustrated arrangement, the magnitude of this voltage varies directly with sensed temperature.

Energization of winding 90 produces heating of leg portion 32, tending to move the lower end thereof (the end remote from anchor 34) outwardly from the plane of the paper. This movement produces a tilting of crosspiece 36 tending to rotate leg portion 30 so that its free end moves downwardly from the plane of the paper. Consequently, heating of leg portion 32 tends to move contact 40 toward contact 42, which is an opposite effect to that produced by energization of heater winding 44.

The thermal system including winding 90 and leg portion 32 is preferably arranged to integrate the energy pulsations applied to the winding 90 as a result of the intermittent operation of contacts 40 and 42 so that the degree of deflection of leg portion 32 in response to heating by winding 90 varies in accordance with the average or effective value of the voltage appearing between conductors 50 and 28 as averaged over a number of cycles of the pulsations of contacts 40 and 42.

While the energization of winding 90 produces a force tending to hold contacts 40 and 42 together, the combination including contacts 40 and 42, leg portion 30 and heater winding 44 operates to maintain contacts 40 and 42 in incipient condition of opening and closing. To re-establish this condition, the average temperature of leg portion 30 must be increased by an amount determined by the increase in temperature of leg portion 32 resulting from the energization of winding 90. The increase in average temperature of leg portion 30 is accomplished by increasing the wattage output of heater 44 as by increasing the duration of the closed intervals of contacts 40 and 42. As a consequence, the effective value of the current through heater winding 44 and hence through senser 12 is increased and the effective voltage difference across the serially interconnected elements 44 and 12 and hence between conductors 50 and 28 is increased. Heater 90 senses and is subjected to this voltage increase, its wattage dissipation being proportional to the square of the voltage applied thereacross. As a result, leg portion 32 tends to be further heated, leg portion 30 must be provided with additional heat in order for the contacts 40 and 42 to remain in their condition of incipient opening and closing, the current through heater 44 and senser 12 correspondingly increases, and the output voltage between conductors 50 and 28 further increases. Thus, it will be seen that the thermal system including heater 90 and leg portion 32, connected as noted, serves as a positive or regenerative feedback arrangement, an increase in the effective voltage between conductors 50 and 28 as the result of an increase in the resistance of senser 12 serving to produce a still further increase in that output voltage, and vice versa.

The regenerative action does not continue to the point of loss of control or to the point of self-destruction of the unit because the power in the heater winding 44 is always greater than the power in the heater winding 90. As the resistance of senser 12 increases, the power in winding 44 during each closed interval of contacts 40 and 42 decreases, tending to keep contacts 40 and 42 closed longer during each closed interval, and the power in winding 90 will tend to further increase the closed time of those contacts. However, since the power in winding 44 is under all conditions greater than the power in winding 90, the contacts 40 and 42 cannot fail to open and therefore regenerative destruction cannot occur. If there is a change in ambient temperature, the heat losses due to radiation effects will not result in run-away action because the power in winding 44 will always remain the dominating influence. This is because the fourth powers of the instant absolute ambient temperature and of the absolute reference (e.g., room) temperature of windings 44 and 90 are such that the power in winding 44 is always greater than that in winding 90 regardless of the ambient temperature.

Despite the equilibrizing effect as above discussed, the system is arranged so that winding 90 produces a greater effect at high sensed temperatures than at low sensed temperatures so as to produce an effective amplification of the change of output voltage with a change in sensed temperature. In the preferred arrangement, the wattage output of winding 90 is small relative to the wattage output of winding 44 and accordingly the temperature of polymetallic leg portion 32 is below that of polymetallic leg portion 30. At low sensed temperatures, the resistance of senser 12 is low, the closed periods of contacts 40 and 42 are relatively short, the output voltage between conductors 50 and 28 is relatively low and the energy dissipated by heater 90 is relatively low, producing but a small elevation of the temperature of leg portion 32 and but a relatively small increase in the output voltage between conductors 50 and 28 at equilibrium conditions. On the other hand, at high sensed temperatures, the resistance of senser 12 is relatively high, contacts 40 and 42 are closed for longer intervals of time, the output voltage between conductors 50 and 28 is relatively high, the heat energy supplied to leg portion 32 by heater 90 is relatively large, the temperature of polymetallic leg portion 32 is elevated to a substantial degree and contact 40 is thereby additionally biased toward contact 42 by a sufficient amount to produce a substantial increase in the output voltage appearing between conductors 50 and 28.

In a constructed embodiment of the invention, with winding 44 having a value of about 14 ohms as above noted, winding 90 was selected to have a resistance of 200 ohms. With winding 90 omitted and with a 10 volt potential across the secondary winding of transformer 22, the output voltage change in response to a change of senser resistance from 10 to 20 ohms was 2 volts (from 4 volts to 6 volts). With winding 90 operating, the output voltage changed a total of 6 volts (from 4 volts to 10 volts) in response to the same change in resistance of senser 12. In that constructed arrangement, the addition of heater 90 produced no discernible or appreciable affect upon the output voltage when the senser was at its low resistance value but served to cause the output voltage between conductors 50 and 28 to rise to a point closely approaching the voltage across the secondary winding of transformer 22 when senser 12 was at its higher value of resistance.

The amount of the positive feedback can be controlled by varying the sizes of the elements and particularly of the heat output relationships of windings 90 and 44. Excessive feedback can, of course, produce instability and in the disclosed arrangement it will be observed that the lowering of the resistance of winding 90 would tend to cause the output voltage between conductors 50 and 28 to reach an effective maximum value (determined by the secondary voltage of transformer 22) at a lower temperature than the upper limit of the selected range of operation of the device.

It will also be appreciated that since the output voltage is equal to the sum of a voltage drop across winding 44 which does not change to any substantial degree with changes in sensed temperature and of a voltage drop across senser 12 which does change with sensed temperature, the effect of unit change in senser resistance can be increased by reducing the resistance of winding 44 relative to the resistance of senser 12. The design limitation upon increasing the sensitivity of the unit in this fashion is normally found in the power dissipating capabilities of senser 12. In a constructed embodiment, however, it was found that the unit still operated satisfactorily with the resistance of heater winding 44 reduced to a value as low as 2 ohms.

As above noted, in the embodiment of the invention illustrated in Fig. 1, a spread or differential is established between the responder-winding voltage at which contacts 68 and 70 will close and the responder-winding voltage at which those contacts will open. In the disclosed arrangement, this spread is achieved by the provision of a permanent magnet. Such a spread can alternatively be accomplished by providing a self-energized lock-in winding on the relay 14 as by disposing an additional heater winding in heat transfer relationship with polymetallic leg portion 56 of relay 14 or an additional heater winding in heat transfer relation with leg portion 54 of device 14 and electrically connecting the additional heater winding so that it is energized when contacts 68 and 70 are closed if it is disposed upon leg portion 56 and de-energized (as by being shorted out) when contacts 68 and 70 are closed if the additional heater winding is placed upon leg portion 54. In the former case, the heater winding on leg portion 56 can be electrically connected in series with hot wire 80 (as by being connected in conductor 78) or can be connected in parallel with hot wire 80. In the latter case, the additional heater winding, disposed in heat transfer relation with polymetallic leg portion 54, can be electrically connected between conductors 78 and 28. The resistance of the additional winding should be selected so as to avoid an improper influence upon the current through wire 80 and upon the action of hot wire relay 68. It will be recognized that these modifications are applicable whether winding 90 is or is not employed to produce the above described amplifying effect and is applicable whether the senser 12 is in series with the winding 44 or is serially connected in conductor 50.

The modified arrangement illustrated in Fig. 2 of the drawings is basically similar to the unit of Fig. 1 and corresponding elements have been designated with corresponding reference characters suffixed by a prime symbol. This modified arrangement, however, includes an additional heating coil 94 disposed in heat transfer relationship with polymetallic leg portion 32' of device 10'. This coil is electrically connected in circuit with hot wire 80' so as to be energized and de-energized concurrently therewith as by being connected in series with that hot wire, as shown, or if desired, in parallel therewith. In accordance with the teachings of the above-identified application of Tore B. Hanssen, winding 94 is adapted and serves partially or wholly to compensate for the differential established by the permanent magnet 70' (or the counterparts thereof as above discussed) or if desired, to overcompensate for that differential so as to cause the system including devices 10' and 14' to operate pulsatingly even in the absence of changes of sensed temperature. It will be observed that under this contemplated arrangement, the electro-thermal system including winding 94 and a portion of polymetallic leg portion 32' is not intended to integrate the pulsations of energy applied thereto as a result of the intermittent operation of contacts 68' and 70', whereas heater winding 90' is intended, as above discussed, to integrate the higher frequency pulsations produced by the intermittent operation of contacts 40' and 42' over a period of time which is large relative to the period of operation of contacts 40' and 42' (e.g., one minute).

It will be perceived that the foregoing principles may also be applied to the obtaining of effective negative feedback so that the change in output voltage in response to unit change in the resistance of the sensing element would be reduced, again embodying the nonlinear characteristic whereby the effective reduction in the output voltage at any given value of resistance of the senser will vary to a substantial extent over the range of resistances of the senser. Such negative feedback can be advantageously employed, for example, to provide improved linearity or to reduce the effective sensitivity of the sensing element.

While the polymetallic elements of devices 10 and 14 have been illustrated to be U-shaped and ambient compensated, the provision of such ambient temperature compensation or the achievement of ambient temperature compensation in this particular fashion is not essential to the practice of all of the principles of the present invention.

While it will be apparent that the embodiments of the invention herein disclosed are well calculated to fulfill the objects of the invention, it will be appreciated that the invention is susceptible to modification, variations and change without departing from the proper scope or fair meaning of the subjoined claims.

What is claimed is:

1. In a system energizable from a source of voltage for actuating a voltage responsive device in accordance with a condition, the combination of resistance means having a resistance which changes with changes of the condition, a pair of electrical contacts, polymetallic means for controlling said contacts, means including said contacts for controlling the voltage responsive device, first electrical heating means for said polymetallic means, means including said electrical contacts and said resistance means for controlling the energization of said first heating means from the source, second heating means for said polymetallic means, and circuit means including said electrical contacts for controlling the energization of said second heating means from the source.

2. The combination of claim 1 in which said first electrical heating means and said electrical contacts produce self-interrupting operation for causing said electrical contacts repetitively to open and close and in which the repetitive opening and closing of said contacts produces pulsating energization of said second heating means.

3. In a system energizable from a source of voltage for actuating a voltage responsive device in accordance with a condition, the combination of resistance means having a resistance which changes with changes of the condition, a pair of electrical contacts, first and second polymetallic means for controlling said contacts and having opposite effects upon the relative positions of said electrical contacts, means including said contacts for controlling the voltage responsive device, first electrical heating means for said first polymetallic means, means including said electrical contacts and said resistance means for controlling the energization of said first heating means from the source, second heating means for said second polymetallic means, and circuit means including said electrical contacts for controlling the energization of said second heating means from the source.

4. The combination of claim 3 in which the voltage applied across said second heating means varies with changes in the resistance of said resistance means.

5. The combination of claim 3 in which said first and second polymetallic means are the two legs of a generally U-shaped polymetallic element, in which the tip of one of said legs is anchored and in which the tip of the other one of said legs moves one of the electrical contacts.

6. The combination of claim 3 in which said first electrical heating means and said electrical contacts produce self-interrupting operation for causing said electrical contacts repetitively to open and close and in which the repetitive opening and closing of said contacts produces pulsating energization of said second heating means and in which said second polymetallic element and said second heating means effectively integrate said pulsations over a period of time so that said second polymetallic element is heated and deflected to a degree determined by the average value of the energy of the pulsations over a period of time.

7. The combination of claim 3 in which said electrical contacts are connected in series with each of said heating means.

8. The combination of claim 7 in which said heating means are connected in parallel with one another with respect to the source.

9. The combination of claim 8 in which said second heating means is also connected in parallel with said resistance means with respect to the source.

10. The combination of claim 9 in which said first heating means and said resistance means are connected in series with one another.

11. The combination of claim 3 in which the voltage applied across said second heating means is controlled conjointly by said first heating means and said resistance means.

12. The combination of claim 3 in which said voltage responsive device includes and controls a second pair of electrical contacts, in which a third heating means is disposed in heat transfer relation with one of said polymetallic means, and in which said second pair of electrical contacts control the energization of said third heating means.

13. The combination of claim 6 in which said voltage responsive device includes and controls a second pair of electrical contacts, in which a third heating means is disposed in heat transfer relation with said second polymetallic means, and in which said second pair of electrical contacts control the energization of said third heating means.

14. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having a magnitude greater than a first selected value for changing said contacts to one of said states and effective when a voltage is applied across said winding having a magnitude less than a second selected value for changing said contacts to the other one of said states, a temperature sensing device comprising a resistor having a high temperature coefficient of resistance disposed in heat transfer relation with the body, means including said temperature sensing device connected to the source for applying a voltage across said winding which repetitively varies between first and second finite magnitudes, at least one of which is controlled by said temperature sensing device and varies in accordance with the sensed temperature, and means for increasing the magnitude of the change of the voltage applied across said winding which occurs in response to a given change of the resistance of said sensing device in one portion of the range of variation of the resistance of said sensing device relative to the change of the voltage applied across said winding which occurs in response to the same change of the resistance of said sensing device in another portion of the range of variation of the resistance of said sensing device.

15. In a system for association with a source of energy for controlling a load device in accordance with a sensed condition, the combination of a first pair of matable electrical contacts having open and closed states, means including said contacts for controlling the load, actuating means including a first polymetallic element and heating means in heat transfer relationship with said polymetallic element and effective when a voltage is applied across said winding having a magnitude greater than a first selected value for changing said contacts to one of said states and effective when a voltage is applied across said winding having a magnitude less than a second selected value for changing said contacts to the other one of said states, resistance means having a resistance which changes with changes of the condition, a second pair of electrical contacts, polymetallic means for controlling said second pair of electrical contacs, means including said second pair of electrical contacts for controlling said heating means, first electrical heater means for said polymetallic means, means including said second pair of electrical contacts and said resistance means for controlling the energization of said first electrical heater means from the source, second electrical heater means for said polymetallic means, and circuit means including said second pair of electrical contacts for controlling the energization of said second electrical heater means from the source.

16. In a system for association with a source of energy for controlling a load device in accordance with a sensed condition, the combination of a first pair of matable electrical contacts having open and closed states, means including said contacts for controlling the load, actuating means including a first polymetallic element and heating means in heat transfer relationship with said polymetallic element and effective when a voltage is applied across said winding having a magnitude greater than a first selected value for changing said contacts to one of said states and effective when a voltage is applied across said winding having a magnitude less than a second selected value for changing said contacts to the other one of said states, resistance means having a resistance which changes with changes of the condition, a second pair of electrical contacts, polymetallic means for controlling said second pair of electrical contacts, means including said second pair of electrical contacts for controlling said heating means, first electrical heater means for said polymetallic means, means including said second pair of electrical contacts and said resistance means for controlling the energization of said first electrical heater means from the source, second electrical heater means for said polymetallic means, and circuit means including said second pair of electrical contacts and said resistance means for controlling the energization of said second electrical heater means from the source and for applying across said second electrical heater means a voltage having an average value which varies with variations of the resistance of said resistance means.

17. In a system energizable from a source of voltage for actuating a voltage responsive device in accordance with a condition, the combination of resistance means having a resistance which changes with changes of the condition, a pair of electrical contacts, first and second polymetallic means for controlling said contacts and having opposite effects upon the relative positions of said electrical contacts, means including said contacts for controlling the voltage responsive device, first electrical heating means for said first polymetallic means, means including said electrical contacts and said resistance means for controlling the energization of said first heating means from the source for varying the output voltage applied to the voltage responsive device in accordance with the resistance of the resistance means, and positive feedback means for amplifying the effect of a change of resistance of the resistance means upon the output voltage comprising second heating means for said second polymetallic means, and connecting means including said electrical contacts for controlling the energization of said second heating means from the source.

18. The combination of claim 17 in which said second heating means is energized by said output voltage.

19. The combination of claim 18 in which the wattage output of said second heating means is small relative to the wattage output of said first means and in which the effect of said second heating means upon said output voltage is minimal at relatively low values of output voltage and is substantial at relatively high values of output voltage.

20. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having a magnitude greater than a first selected value for changing said contacts to one of said states and effective when a voltage is applied across said winding having a magnitude less than a second selected value for changing said contacts to the other one of said states, a temperature sensing device comprising a resistor having a high temperature coefficient of resistance disposed in heat transfer relation with the body, means including said temperature sensing device connected to the source for applying a voltage across said winding which varies in accordance with variations of the resistance of said temperature sensing device, and means for increasing the magnitude of the change of the voltage applied across said winding which occurs in response to a given change of the resistance of said sensing device in one portion of the range of variation of the resistance of said sensing device relative to the change of the voltage applied across said winding which occurs in response to the same change of the resistance of said sensing device in another portion of the range of variation of the resistance of said sensing device.

21. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having a magnitude greater than a first selected value for changing said contacts to one of said states and effective when a voltage is applied across said winding having a magnitude less than a second selected value for changing said contacts to the other one of said states, a temperature sensing device comprising a resistor having a high temperature coefficeint of resistance disposed in heat transfer relation with the body, means including said temperature sensing device and electrothermal self-interrupting means including a polymetallic element and a pair of contacts controlled by said polymetallic element connected to the source for applying a voltage across said winding which varies in accordance with variations of the resistance of said temperature sensing device, and means for increasing the magnitude of the change of the voltage applied across said winding which occurs in response to a given change of the resistance of said sensing device in one portion of the range of variation of the resistance of said sensing device relation to the change of the voltage applied across said winding which occurs in response to the same change of the resistance of said sensing device in another portion of the range of variation of the resistance of said sensing device comprising heating means for said polymetallic element energizable from the source of energy under the control of said electrical contents of said electrothermal self-interrupting means.

22. The combination of claim 21 in which said electrothermal self-interrupting means supplies said voltage as a series of relatively high frequency pulses and in which said heating means integrates said pulses.

23. The combination of claim 21 in which the average value of the voltage applied across said heating means varies in accordance with the resistance of said sensing device.

24. The combination of claim 14 in which said means for applying a voltage across said winding includes electrothermal self-interrupting means including a polymetallic element and a pair of contacts controlled by said polymetallic element and in which said means for increasing the magnitude of the change of the voltage comprises heating means for said polymetallic element energizable from the source of energy under the control of said electrical contacts of said electrothermal self-interrupting means.

25. The combination of claim 24 in which the average value of voltage applied across said heating means varies in accordance with the resistance of said sensing device.

References Cited in the file of this patent

UNITED STATES PATENTS

| | | |
|---|---|---|
| 2,205,637 | Smulski | June 25, 1940 |
| 2,479,319 | Crowley et al. | Aug. 16, 1949 |
| 2,833,889 | Boddy | May 6, 1958 |
| 2,846,531 | Baker | Aug. 5, 1958 |
| 2,846,556 | Whinery | Aug. 5, 1958 |
| 2,894,105 | Long et al. | July 7, 1959 |
| 2,910,569 | Boddy | Oct. 27, 1959 |